United States Patent [19]

Showalter

[11] Patent Number: 4,506,998

[45] Date of Patent: Mar. 26, 1985

[54] ELASTOMERICALLY SUPPORTED PIVOTED PAD BEARING

[75] Inventor: Merle R. Showalter, Madison, Wis.

[73] Assignee: Automotive Engine Associates, Madison, Wis.

[21] Appl. No.: 502,577

[22] Filed: Jun. 9, 1983

[51] Int. Cl.³ .............................................. F16C 17/03
[52] U.S. Cl. ..................................... 384/312; 384/215
[58] Field of Search ................ 384/99, 117, 119, 122, 384/124, 125, 215, 224, 306–312

[56] References Cited

U.S. PATENT DOCUMENTS 1,425,979  8/1922  Kingsbury ........................... 384/224
3,930,691  1/1976  Greene ............................. 384/307 X
4,257,495  3/1981  Perry .............................. 384/215 X Primary Examiner—Stuart S. Levy
Assistant Examiner—David Werner
Attorney, Agent, or Firm—Witherspoon & Hargest

[57] ABSTRACT

A pivoted pad bearing is supported on an elastomeric pad fully contained by a supporting structure. The elastomeric pad contains some liquid. The liquid filled pad is extremely strong in compression but can pivot. The pivoted pad assembly is somewhat flexible. This flexibility is useful under conditions of fluctuating load where squeeze film effects are superimposed upon wedge film effects.

2 Claims, 5 Drawing Figures

ELASTOMERICALLY SUPPORTED PIVOTED PAD BEARING

BACKGROUND AND OBJECTS

It has been known since Mitchell and Kingbury's calculations of 1905 that the pivoted pad slider bearing is a desirable kind of bearing with excellent friction and film stability characteristics. The pivoted pad adjusts the angle of convergence of the oil wedge film between the pad surface and a surface sliding with respect to the pad surface so that the convergence angle of the wedge film adjusts to establish a balance of oil pressure force moments about the pad. This pivoting permits the pad to adjust the wedge angle to optimize friction and oil film thickness over a wide range of operating conditions. Pivoted pads have been in service for more than 70 years. However, the load bearing capacity of pivoted pad slider bearings is limited because of deformations of the pads and limitations of the support structure. It is the purpose of the present invention to provide an elastomeric support structure for a pivoted pad which is extremely strong in compression, pivots freely, and is particularly desirable for applications of a pivoted pad slider involving fluctuating forces and squeeze film effects.

Attempts to produce a pad pivot by simply mounting the metal pivoting pad on an elastomeric pad have been made before, and have been relatively unsuccessful. Elastomeric pads, even of materials of small Young's modulus, are very stiff with respect to pivoting since pad compressibility constrains the pivoting. In the present elastomeric pad design this compressibility effect is eliminated because the elastomeric pad contains within itself a small volume of liquid which can transfer volume back and forth as the pad pivots. When this elastomeric pad is fully surrounded structurally (so that bulging is constrained and pad bulk modulus is important with respect to direct compression), a pad support is formed which is strong with respect to direct compression, but quite flexible and free with respect to the small pivoting angles required for a pivoted pad slider support.

This liquid filled elastomeric pad support structure tends to bend the pad into a more convex shape when the bearing pad is loaded. This is not desirable for applications where the bearing load is heavy and steady. However, this bending tendency is useful if the pad is subject to fully reversing loads. In a case where load reversal occurs and a thick oil film is established between the pad and its coacting sliding surface, the deformability of the elastomerically supported pad acts to automatically adjust pad geometry to maximize the importance of the squeeze film effect. This produces thicker oil films than would occur without pad compliance, and consequently reduces friction.

IN THE DRAWINGS

DETAILED DISCUSSION

Figure 1:
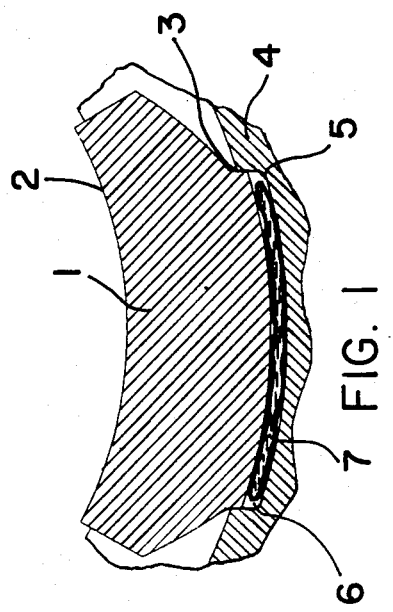
FIG. 1 is a cross sectional view showing the journal contacting pivoted pad with its liquid filled elastomeric pad structure fully surrounded by a support structure.

See FIG. 1. Metallic pivoted pad 1 is adapted to contact a journal bearing with journal contacing surface 2 and has support engaging geometry 3 which fits into an indentation and support structure 4. In the volume between pad 1 and support structure 4 is an elastomeric pad 6 which contains within itself a liquid filled bag 7. Because liquid filled elastomeric pad 6, 7 has a high bulk modulus and is fully contained, this pad is very strong with respect to direct compression from surface 2, but is quite free to pivot for small angles. The liquid filled elastomer pad is incompressible, so the total volume of the liquid-elastomer pad is constrained. However, the liquid inside the elastomer pad can flow within the pad. It can be shown mathematically that transfer of liquid from place to place within the elastomer pad while the elastomer pad is in compression permits the metallic pad to pivot for small angles as if the metallic pivoted pad were pivoting about a unique virtual pivot point centered within the elastomeric pad. Because of the pressure equalization of the liquid in bag 7 the pressure distribution in the pad 6, 7 will be different from the pressure distribution of the oil film contacting on surface 2. The pressure differential between the oil film and the elastomeric pad will tend to bend surface 2 in a manner reducing its radius of curvature. For statically loaded cases this may be tolerable, but is an undesirable result. However, for machines subject to fully reversing fluctuating loads where squeeze film effects are important, this bending characteristic acts to maximize squeeze film forces. This improves film stability and reduces friction.

Figure 2:
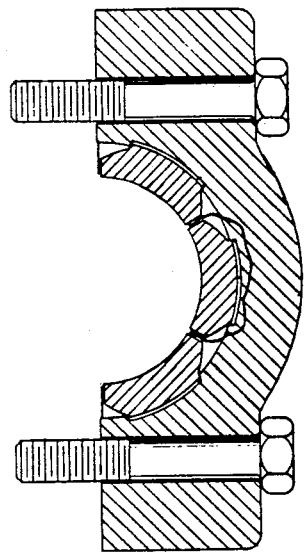
FIG. 2 shows three of the pads shown in FIG. 1 mounted in a main bearing cap or similar assembly.

FIG. 2 illustrates three pivoted pads such as those shown in FIG. 1 installed in a main bearing cap. In an engine main bearing cap application, the loads are fully reversing so that the bending of the pad is desirable.

Figure 3:
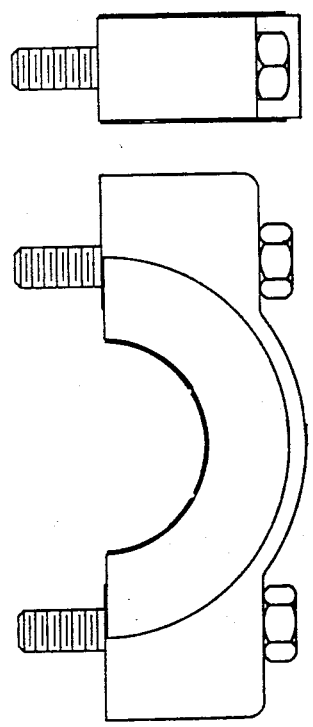
FIG. 3 is a view of the main bearing cap, showing its side seals.
Figure 4:
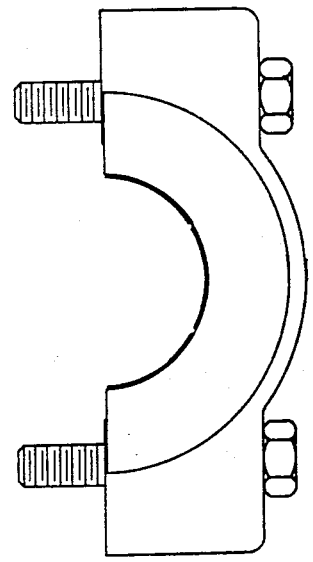
FIG. 4 is a view of the main bearing cap from the side and parallel to the journal the main bearing cap would engage.
Figure 5:
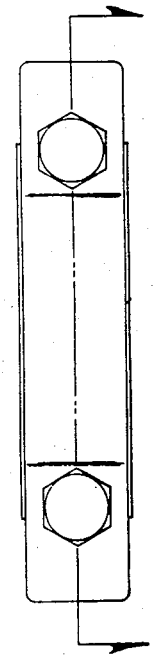
FIG. 5 is a bottom view of the main bearing cap.

FIG. 3 illustrates the end seal arrangement which would be applicable to the main bearing cap shown in cross section in FIG. 2. This end seal arrangement is required to maintain oil in the pads. FIG. 4 is a side view and FIG. 5 is a bottom view of the main bearing cap.

The elastomerically supported pivoted pad slider will have many applications in reciprocating machinery subject to fluctuating loads. Particularly for large geometries where the nonlinear effects of squeeze film fluid mechanics become very important, the elastomerically supported pivoted pad structure will form an inexpensive and robust pad support capable of bearing extremely heavy loads. The bearing support may find applications in metal stamping, forging, and other heavily loaded cases where squeeze film effects are important.

It is claimed:

1. A pivoted pad slider bearing adapted to permit tilting of a metallic pad with respect to a surface sliding relatively to said pad so that said metallic pad pivots about a virtual pivot point so that a converging wedge oil film is established between said metallic pad surface and said relatively sliding surface and said metallic pad surface tilts until a moment balance of the oil film pressure forces is established about said virtual pivot point where said metallic pivoted pad engages a rigid support structure so that said metallic pad and said support structure fit together in the manner of two dies forming a fully enclosed cavity, the junction between said metallic pivoting pad and said support structure having enough clearance to permit said metallic pad to tilt in any direction over the range of pivot angles relevant to a pivoted pad slider bearing, but where said clearances are tight enough so that said pad motion with respect to said rigid structure is constrained between narrow limits, wherein said cavity is completely filled with a flexible and incompressible liquid containing elastomeric pad adapted to function within said cavity with respect to bearing loads from said pad so that it is free to change its shape with only low mechanical resistance but is invariant in volume, whereby the locus of positions of said metallic pad with respect to said support which exactly conserves the total volume of said elastomeric pad are such that the metallic pad can be said to pivot about a geometrical virtual pivot point, so that said liquid containing elastomeric pad structure supports compressive loads on said metallic pad sliding surface in an approximately hydrostatic manner and yet supports said metallic pad hydrostatically in such a way that said metallic pad is free to pivot about said geometrical virtual pivot point, and said pad is very strongly and stiffly supported with respect to bearing loads on said pivoted pad's bearing surface so that an extremely rugged pivoted pad slider bearing assembly is formed.

2. The invention as set forth in claim 1 and wherein the metallic pivoted pad is thick and rigid so as to resist bending moments due to the pressure differential between the wedge oil film and the elastomer pad so that said metallic pad can support heavy oil film pressures without excessive bending.

* * * * *